July 4, 1944. A. BOYNTON 2,352,612
BOTTOM HOLE REGULATOR AND CHOKE IN COMBINATION
Filed Sept. 17, 1941 5 Sheets-Sheet 2

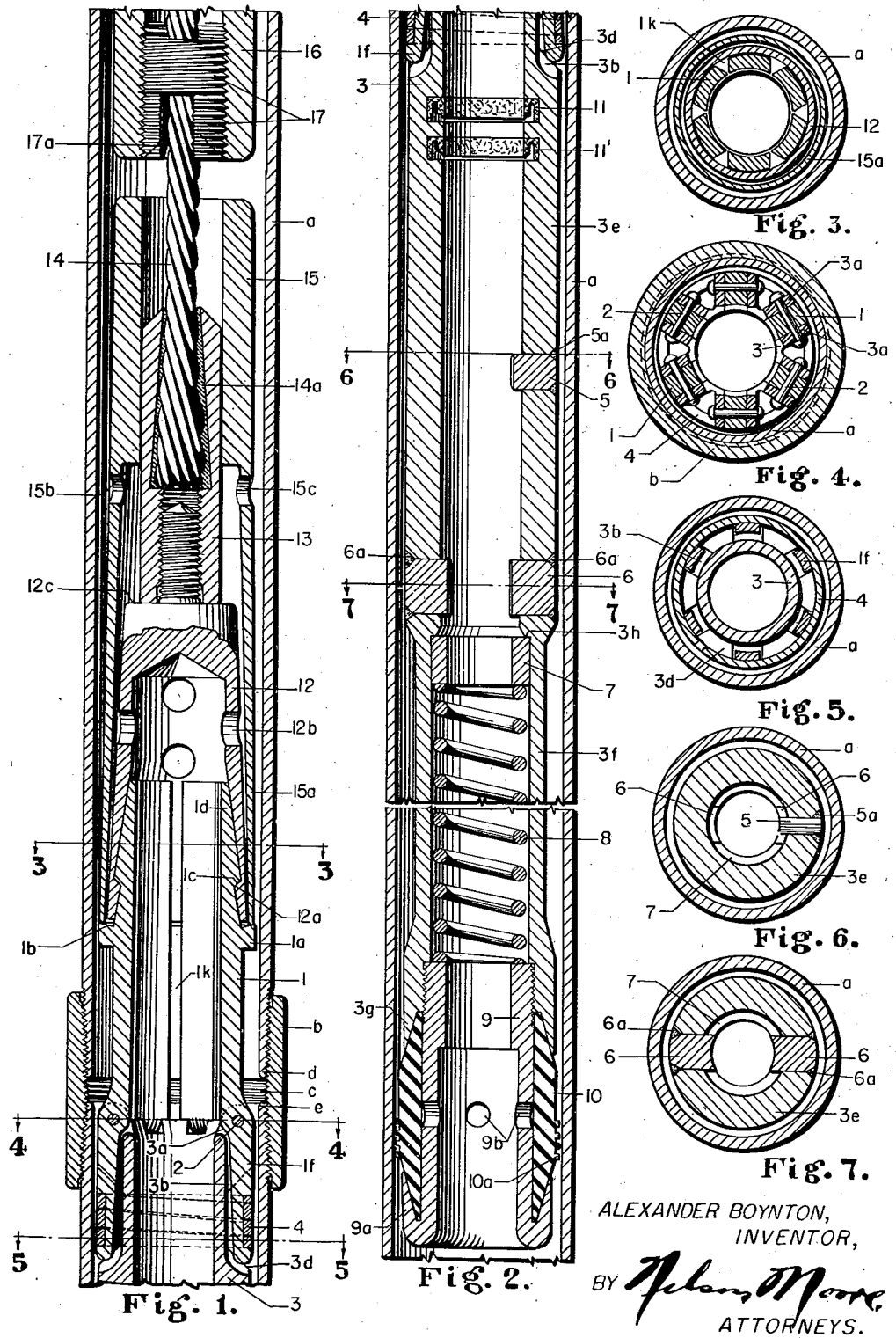

ALEXANDER BOYNTON, INVENTOR,
BY ATTORNEYS.

July 4, 1944.    A. BOYNTON    2,352,612
BOTTOM HOLE REGULATOR AND CHOKE IN COMBINATION
Filed Sept. 17, 1941    5 Sheets-Sheet 3

ALEXANDER BOYNTON, INVENTOR,
BY
ATTORNEYS.

July 4, 1944.   A. BOYNTON   2,352,612
BOTTOM HOLE REGULATOR AND CHOKE IN COMBINATION
Filed Sept. 17, 1941   5 Sheets-Sheet 4

ALEXANDER BOYNTON,
INVENTOR,
BY *Nelson Morris*
ATTORNEYS.

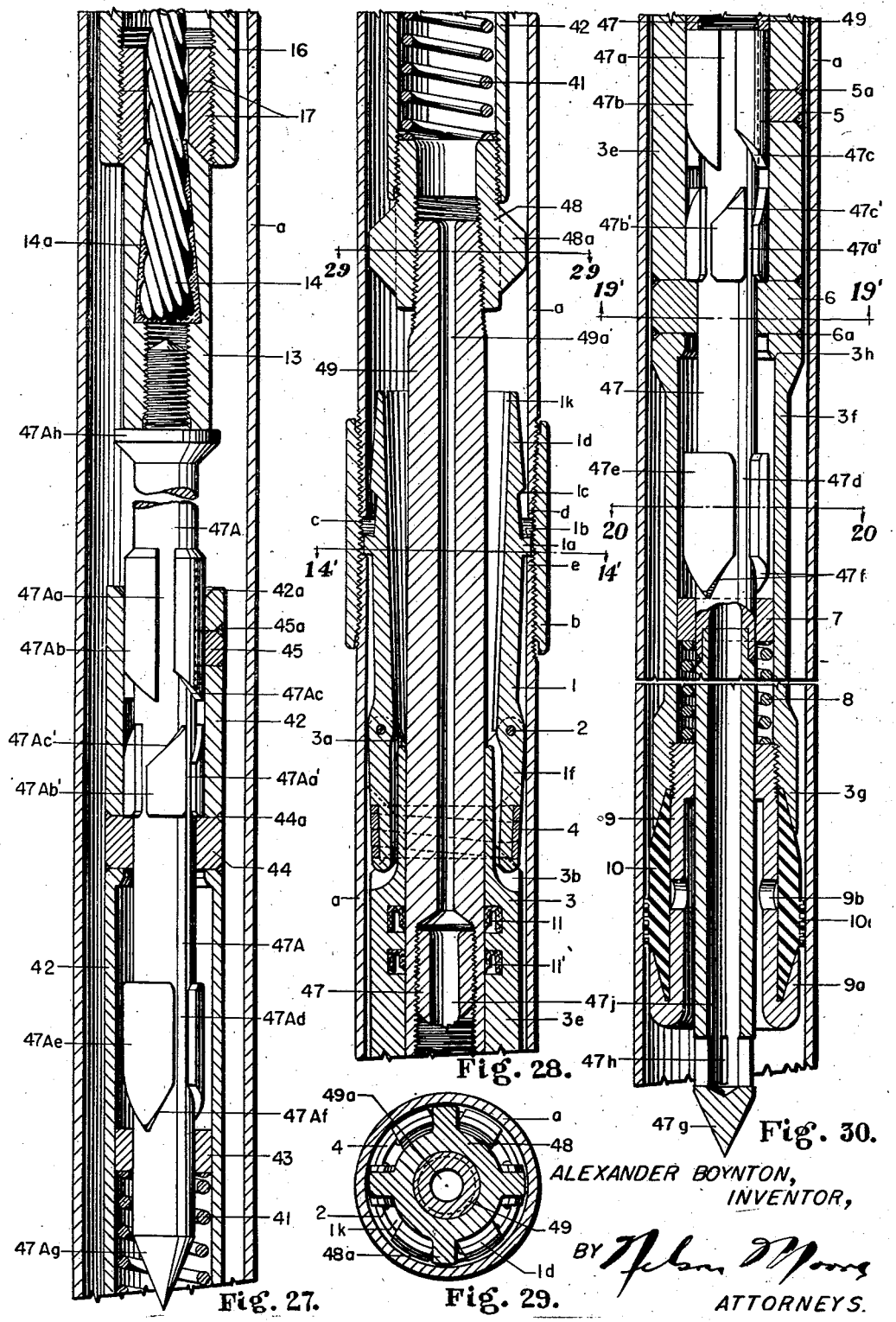

Patented July 4, 1944

2,352,612

UNITED STATES PATENT OFFICE 2,352,612

BOTTOM HOLE REGULATOR AND CHOKE IN COMBINATION

Alexander Boynton, San Antonio, Tex.

Application September 17, 1941, Serial No. 411,254

9 Claims. (Cl. 166—2)

My invention relates to bottom hole pressure regulators and bottom hole chokes in combination, anchoring means for securing the combination or a choke alone in wells, and catching and releasing tools in combination with such regulators, chokes, and anchoring means.

An object is to securely set an anchoring base in the tubing or casing at any desired place in the lower regions of a well without the necessity of pulling the tubing out of the well.

Another object is to secure a pressure regulator and a choke in combination or a choke separately to such base by means operative from the top of the well.

Another object is to remove the regulator and choke together, and to remove the choke, when used alone, by means operative from the top of the well.

Another object is to remove the anchoring base and reset it at any other desired place or replace it with another by means operative from the top of the well.

A further object is to effect either of said purposes by the use of tools which may be lowered into the well upon either a cable, rods or tubing.

Due to the higher temperatures usually prevailing in the lower regions of deep wells, the bottom hole regulator and choke largely overcome the freezing temperatures frequently resulting from regulating and choking high pressure gas at the ground surface.

In this specification, it will be assumed that a cable will be employed for running all tools into the well and removing them therefrom, with the understanding that rods or tubing may be substituted therefor at will. It will also be assumed that the anchoring base and regulator and/or choke will be set in the tubing although the same operation can be performed in the casing or in a blank liner with equal facility.

I accomplish the foregoing objects as follows:

1. I lower an anchoring base, adapted to have a bottom hole regulator and choke in combination or either a bottom hole regulator or choke removably attached to it, by means of a cable attached to a latch which latch is releasably attached to the regulator choke assembly, or the choke as the case may be. The anchoring base being lowered to the proper depth, I drop a weight over the cable, causing an impact which disengages the latch from the base which then automatically expands and secures itself in the tubing proximate the place where it was released.

2. The anchoring base being set in the tubing, I lower a regulator and choke in combination, or a choke alone, as the case may be, attached to a tool which releases the regulator and choke in combination, or the choke, as the case may be, as soon as the same is connected to the base.

3. To remove the regulator and choke, combined or the choke, if it alone is installed, I lower a catching and releasing tool which fastens to the regulator and choke assembly or to the choke while the tool, at the same time, causes the regulator and/or choke to turn loose the hold which previously secured it to the anchoring base.

4. I then lower another regulator and choke assembly or either separately and fasten it to the previously anchored base by means of said catching and releasing tool which, at the same time, releases the newly set regulator and choke, or the choke, when used alone.

5. To remove the anchoring base after the regulator and/or choke have been removed, I lower another form of latching tool combined with a catching and releasing tool of the kind employed to set or reset the combined regulator and choke, and fasten them to the base with the help of a weight; whereupon the base may be withdrawn by the combination tool.

The foregoing objects are attained in the manner above stated by mechanism illustrated in the accompanying drawings, in which—

Fig. 1 is a longitudinal section through the anchoring shell setting tool, also showing the fingers and the upper portion of the shell.

Fig. 2, a continuation of Fig. 1, is a longitudinal section through the lower portion of the anchoring shell assembly.

Fig. 3 is a cross section on the line 3—3, Fig. 1.

Fig. 4 is a cross section on the line 4—4, Fig. 1.

Fig. 5 is a cross section on the line 5—5, Fig. 1.

Fig. 6 is a cross section on the line 6—6, Fig. 1.

Fig. 7 is a cross section on the line 7—7, Fig. 2.

Fig. 27 is a longitudinal section through the upper portion of the choke, separate from the regulator, being placed in the well just before it is anchored in the anchoring shell.

Fig. 28 is a longitudinal section continuing downward from the mechanism partially shown in Fig. 27 and showing the upper portion of the anchoring shell.

Fig. 29 is a cross section on the line 29—29, Fig. 28.

Fig. 30 is a longitudinal section continuing downward from the mechanism partially shown in Fig. 28, completing the assembly partially shown in Figs. 27 and 28.

Similar characters are employed to designate similar parts throughout the several views.

The invention will be described by units and operations as follows:

(1) The anchoring shell assembly, consisting of the parts 1 through 11' (see Figs. 1, 2, 8, 10, 11, 12, 28 and 30).

Figure 11:
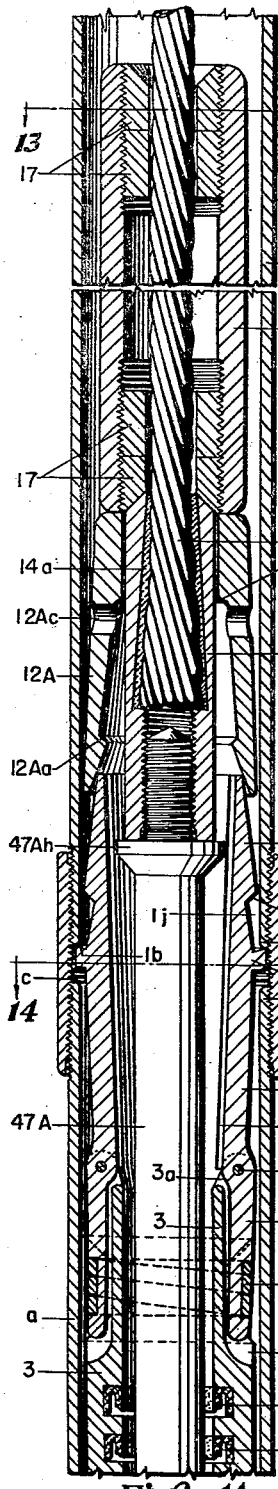
Fig. 11 is a longitudinal section of the modified latching tool assembly in combination with a portion of the catching and releasing tool, also showing the upper portion of the anchoring shell assembly in position to be disengaged from the tubing by the latching shell and to be engaged by the catching and releasing tool for removal from the well.

(2) The anchoring shell placing tool consisting of the parts 12 to 17a, both inclusive (see Figs. 1 and 11).

(3) The anchoring shell and placing tool in combination consisting of the parts 1 through 17a (see Figs. 1 and 2).

Figures 8, 9, 10:
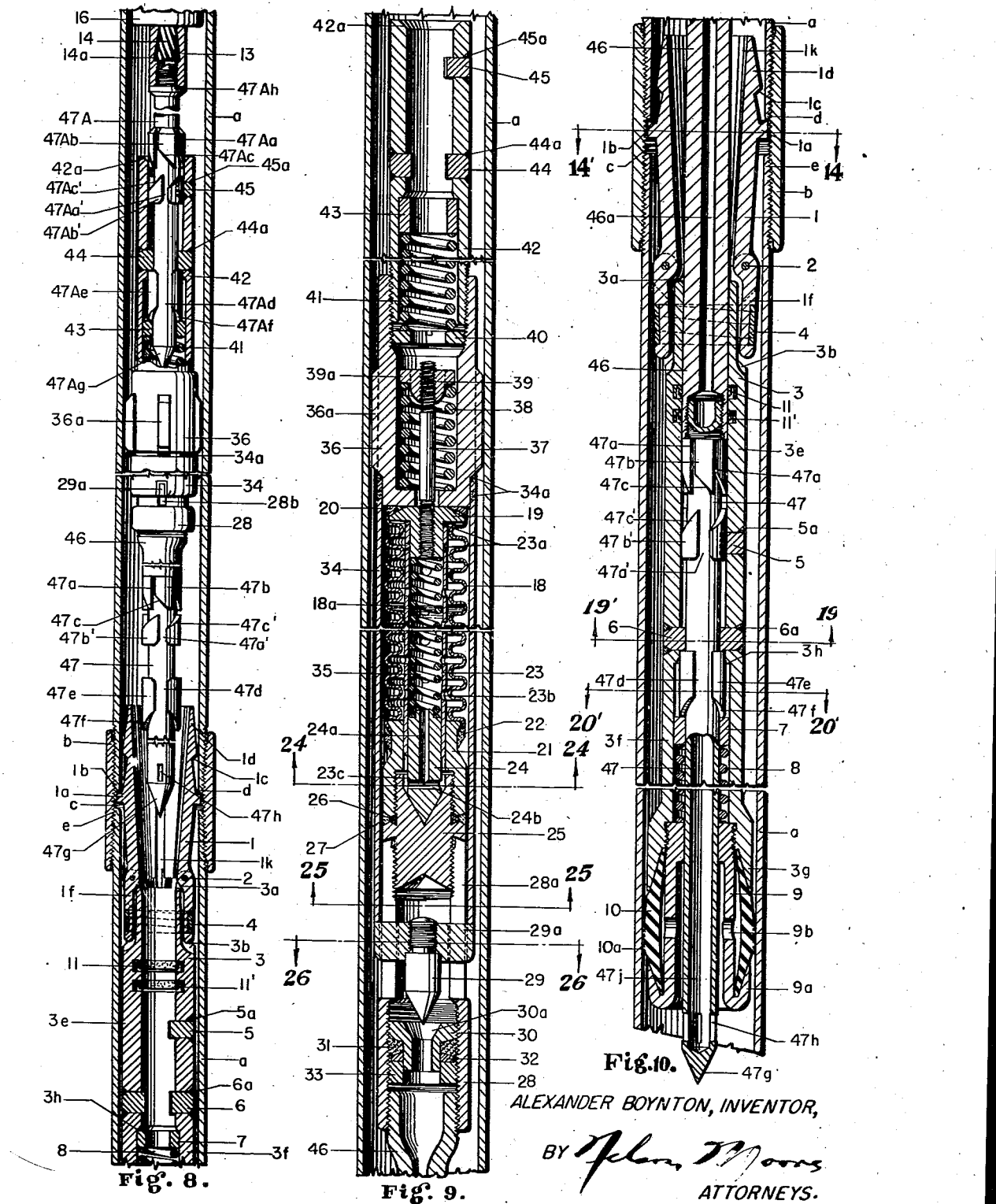
Fig. 8 is mainly a longitudinal section with portions broken away showing the anchoring shell in place with the combination pressure regulator and choke assembly approaching the anchoring shell or being withdrawn therefrom.
Fig. 9 is a longitudinal section through the complete pressure regulator and part of the choke in place.
Fig. 10 is a longitudinal section completing the assembly in Fig. 9 and showing the anchoring shell in place.

(4) The pressure regulator and choke assembly in place, consisting of parts 18 to 47j, both inclusive (see Figs. 9 and 10).

Figure 21:
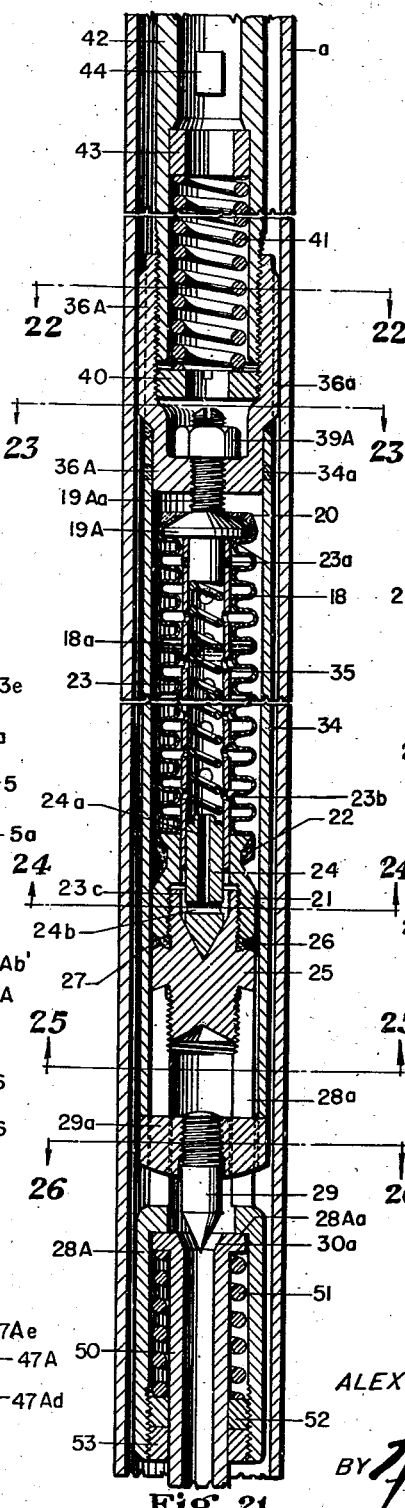
Fig. 21 is a longitudinal section of a modified form of pressure regulator, differing from that shown in Fig. 9.
Figure 22:
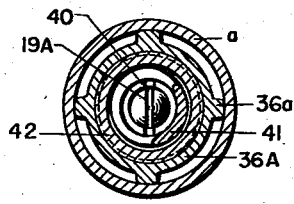
Fig. 22 is a cross section on the line 22—22, Fig. 21.
Figure 23:
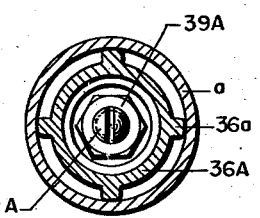
Fig. 23 is a cross section on the line 23—23, Fig. 21.
Figure 24:
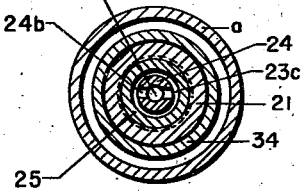
Fig. 24 is a cross section on the line 24—24, Figs. 9 and 21.

(5) The pressure regulator, modified form, Fig. 21, consisting of new parts, 19A, 19Aa, 28A, 28Aa, 36A, 39A, 50, 51, 52, and 53. This regulator, not claimed herein, is claimed in my copending application Serial No. 408,521, filed August 27, 1941.

(6) The catching and releasing devices consisting of parts 47 and 47A with letter suffixes (see Figs. 8, 9, 10, 11, 12, 27, 28, and 30).

(7) The removing pressure regulator and choke assembly (see Figs. 8, 9 and 10).

Figure 12:
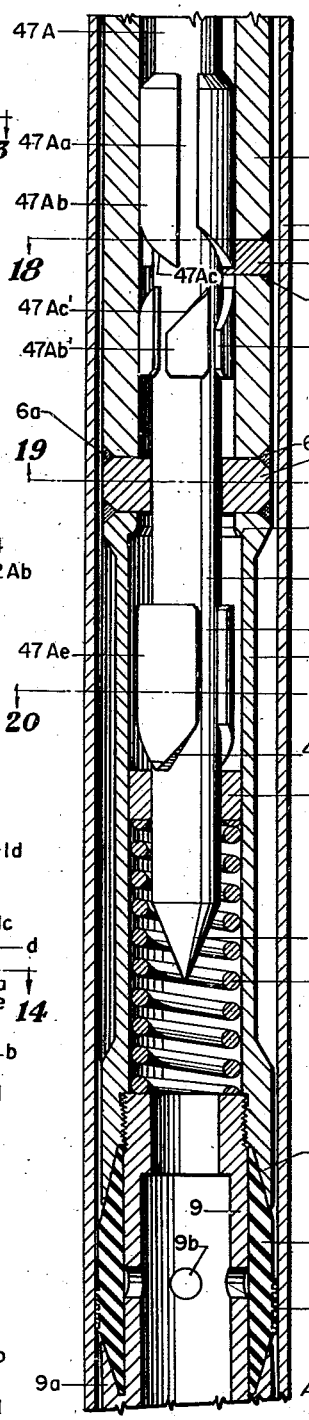
Fig. 12 is a longitudinal section continuing Fig. 11 and showing the lower portion of the anchoring shell assembly and of the catching and releasing tool.

(8) The removing anchoring shell assembly (see Figs. 11 and 12).

(9) The choke nipple 48, in combination with the pressure regulator, as in Figs. 9 and 10 and the choke nipple 49 alone as in Figs. 28 and 30.

These units and operations will be described separately for clearness.

*The anchoring shell assembly*

The purpose of this assembly is to provide an anchoring foundation which may be secured between the ends of the tubing wherever it may be desired to position the pressure regulator and/or choke.

Figure 15:
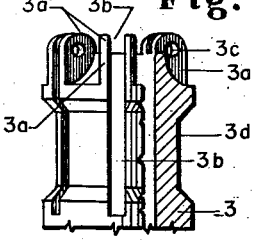
Fig. 15 is mainly an outside view showing a portion in vertical section of the upper end of anchoring shell also appearing in Figs. 1, 4, 5, 8, 10, 11, 16, and 28.
Figure 16:
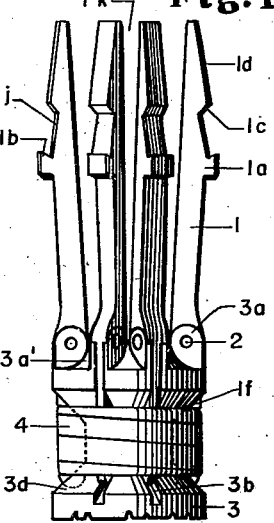
Fig. 16 is an outside view of the anchoring mechanism of the anchoring shell.
Figure 17:
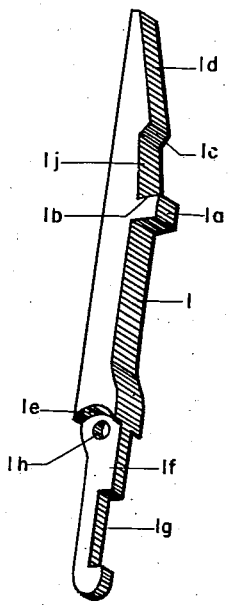
Fig. 17 is a perspective of one of the dog fingers.

With special reference to Figs. 1 and 2, a plurality of dog fingers 1, are hinged upon the anchoring shell 3 by the rivets 2, adapted to be received through the openings 1h, Fig. 17, and the aligning openings 3c through the upstanding arms 3a of the base 3, Fig. 15. Each of these fingers has a curved shoulder 1e adapted to engage upon the upper arched surface 3a' of the base 3, and to rock radially thereon simultaneously with the hinging movement of the fingers upon the rivets 2, Fig. 16. Each finger has a depending extension 1f freely received within the slots 3b of the shell 3. These slots are of such depth as to permit the fingers 1 to rock outwardly so that the dogs 1a may assume the expanded position shown in Figs. 8, 10, 11, and 28. The coiled spring 4 is freely received within the notches 1g, Fig. 17. The recess 3d, Figs. 15 and 16, provides room for the expansion and contraction of this spring which is normally of such internal diameter and force as to urge the upper ends of the fingers 1 to their expanded position between the adjacent tubing ends and the lower extensions 1f of the fingers to their innermost position within the slots 3b.

Each finger has a shoulder 1c, formed by the notch 1j, adapted to be engaged over a mating shoulder 12a of the latching shell 12 when the fingers 1 are forced inward, as appears in Fig. 1.

The lower tubular extension 3e of the shell 3 has a guide lug 5 which may be secured in place by the weld 5a and has also two oppositely positioned pull or securing lugs 6 which may be secured in place by the welds 6a, as appears in Figs. 2, 8, 10, 12, and 30.

The ring 7, freely slidable within the lower tubular extension 3f of the shell 3, is normally urged upon the annular shoulder 3h by the expansive force of the coiled spring 8, having slight clearance within the tubular portion 3f. The lower end of this spring is engaged upon the upper end of the nipple 9 which has threaded engagement within the lower end of the portion 3f of the shell 3.

The expansible rubber sleeve 10, having annular peripheral enlargements 10a closely slidable within the tubing a, has its upper and lower ends received within the retainer flanges 3g and 9a, respectively, of the shell 3 and the nipple 9. The enlargements 10a are for the purpose of obstructing the upward passage of fluid seeking to pass between the tubing a and the sleeve 10; thereby causing the force of such fluid to act through the openings 9b to expand the sleeve 10 and cause it to seal tightly upon the tubing a.

The U cups, or other packing 11 and 11', are fitted into internal annular recesses within the thick walled portion 3e of the shell 3. These cups are slidable closely over the choke nipple 46 for the purpose of co-acting with the sleeve 10 to prevent upward migration of well fluid, except through the regulator and choke, as will appear more fully further on in this specification.

*The placing tool for the anchoring shell*

The latching shell 12, Fig. 1, having the annular internal shoulder 12a adapted to be engaged under the mating shoulders 1c of the dog fingers, is shown with threaded connection to the cable attachment member 13, the cable 14 being secured within the upper portion thereof by babbitt 14a.

The releasing shell 15, having clearance over the members 13 and 12, has its lower extension 15a adapted to be engaged upon the dogs 1a of the fingers 1. The internal annular shoulder 15b is adapted to land upon the shoulder 12c of the shell 12.

Figure 13:
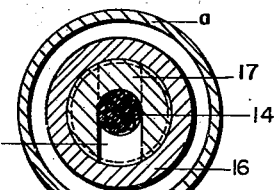
Fig. 13 is a cross section on the line 13—13, Fig. 11.

The tubular weight 16, which may be of any desired length, is adapted to be dropped over the cable 14. The guide bushings 17 are slotted as at 17a, Fig. 13, in order that they may be positioned conveniently over the cable and screwed into the ends of the weight member. Manifestly, the slots 17a should be positioned so as to be out of alignment with each other as shown when the guide bushings are in place.

It will be observed that the central opening through the weight member 16 is of somewhat greater diameter than that of the member 13, in order to permit the weight to be placed or removed over the lower end of the cable.

*The anchoring shell and placing tool in combination*

In order to place the anchoring shell 3 in the tubing at any desired depth, the dogs 1 and the shell 12 will be assembled as shown in Fig. 1, the latched engagement between these members being formed by pressing the shell 12 over the assembly of fingers 1. In forming this connection, the tapered upper extension 1d will slide within the correspondingly tapered lower end of the shell 12 until the latching shoulder 12a engages under the shoulders 1c of the fingers. In this operation, the spring ring 4 will be expanded and tend to secure this engagement.

It will be observed that the shoulders 1c and 12a are tapered at mating obtuse angles so that the engagement formed as in Fig. 1 may be disconnected by a force tending to drive apart the members 1 and 12.

The assembly being formed as in Figs. 1 and 2, the same is lowered to the desired place in the tubing a, less the weight 16. This weight is dropped then to impact the releasing shell 15 which has its lower end resting upon the dogs 1a. The force of this impact disconnects the latched engagement between the members 1 and 12. The contracting force of the coiled spring ring 4 causes the fingers 1 to rock inwardly at their lower extremities and outwardly at their upper extremities, the rocking movement taking place upon the rivets 2. The dogs 1a then strongly engage the tubing a, but the weight of the anchoring shell assembly causes it to fall until the dogs 1a reach an opening c within a coupling b, connecting the joints of tubing. The dogs 1a then expand instantly and contact the lower joint of tubing at e (see Fig. 28). The running-in tool is then withdrawn, the shoulder 15b of the releasing shell now contacting the shoulder 12c of the latching shell and the weight 16 riding out of the well upon the upper end of the shell 15.

While the assemblies of the anchoring shell and the placing tool are being lowered, their downward movement would be retarded, due to the fact that the expanded lower end 15a of the shell 15 has only slight clearance within the tubing, if it were not for the lateral openings 12b and 15c. These openings permit upward escape of the fluid from below said assemblies into the tubing above.

The pressure regulator and/or choke assembly is now ready to be lowered into the tubing, but first this assembly will be described.

*The pressure regulator assembly*

The regulator element of this assembly is a modification of and an improvement upon my Patent No. 2,007,363.

The catching and releasing tool element of the assembly is a modification of and an improvement upon the construction shown in my Patent No. 2,250,463.

Referring particularly to Figs. 9 and 10, the metallic bellows 18 has its upper end hermetically closed by the connection member 19 and the solder or weld 20. The lower end of the bellows is hermetically sealed by the connection member 21 and the solder or weld 22.

Within the bellows, the guide tube 23 has slight clearance. The upper end of this tube is shown pressed over the lower central extension of the member 19 to which it may be secured by the welds 23a.

The lower end of the tube 23 has a free sliding clearance over the spring base 24 and has similar clearance within the connection member 21.

The coiled spring 35, having slight clearance within the tube 23, has its ends engaged between the members 19 and 24.

Figure 25:
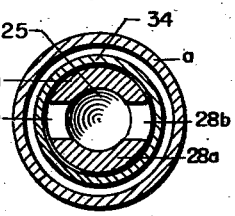
Fig. 25 is a cross section on the line 25—25, Figs. 9 and 21.
Figure 26:
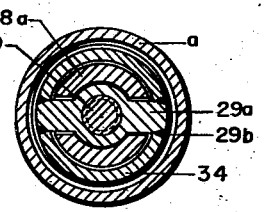
Fig. 26 is a cross section on the line 26—26, Figs. 9 and 21.
Figure 18:
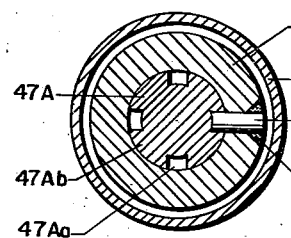
Fig. 18 is a cross section on the line 18—18, Fig. 12.
Figure 19:
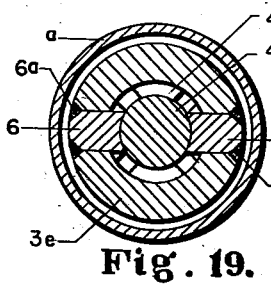
Fig. 19 is a cross section on the line 19—19, Fig. 12.
Figure 20:
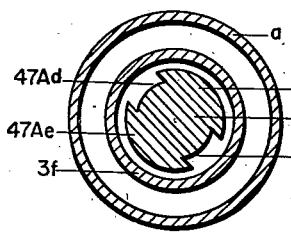
Fig. 20 is a cross section on the line 20—20, Fig. 12.

The base connection 25 has threaded connection within the member 21 to which it is further secured by the weld 27, the packing 26 being employed to keep the connection hermetic until the weld 27 can be made in the process of assembling. The lower end of the plug 25 has threaded engagement within the semi-cylindrical uprights 28a of the base member 28 (see Figs. 25 and 26).

The valve connection 29a (see Fig. 26) is in the form of a crossbar having its ends secured within the lower end of the drive sleeve 34 by the welds 29b. This crossbar travels in the slot 28b (see Figs. 25 and 26).

The valve 29, having threaded connection within the central enlargement of the member 29a (see Fig. 26) is adapted to close upon the valve seat 30a of the member 30 having threaded connection within the lower tubular portion of the member 28.

The packing 31 is urged upon the member 30 by the gland ring 32 by force of the threaded engagement of the gland driver ring 33 within the member 28, the evident purpose of the packing 31 being to prevent leakage of fluid along the threads of the member 30 when the valve 29 is seated in a manner that will be explained later.

The drive sleeve 34 may have its upper end pressed over the member 36 to which it may be further secured by the welds 34a.

The rod 37, having its lower end threadedly joined to the member 19, extends upward centrally of an axial chamber within the member 36 which member has an internal circular flange at its lower end. This flange supports the coiled spring 38 and has a central opening through which the rod 37 projects with clearance. The fins 36a of the connection, having slight clearance within the tubing a, serves as guides to position the bellows assembly central of the tubing. The wing nut 39, having threaded engagement with the rod 37, has wings 39a adapted to engage and compress the spring 38.

Preferably, the bellows is filled partially with a liquid such as glycerine. The top of this liquid is indicated at 18a. The space above the liquid in the bellows is an air pocket of such length that the bellows will not become permanently deformed if exposed to great external pressure such as would compress this air pocket to a negligible length. The end clearance 25c between the lower end of the guide pipe 23 and the member 25 is of such length as will allow the bellows to be so compressed without the members 23 and 25 becoming impinged upon each other when the valve 29 is seated upon the member 30. The longitudinal opening 24a and the lateral openings 24b of the member 24 and the lateral openings 23b of the guide pipe 23 provide that the liquid within the bellows will circulate freely to accommodate its displacement as the hollows responds in length to external pressure.

Attention is directed to the fact that metallic bellows made of strong, corrosive-resistant materials, such as Monel metal and stainless steel, is now available. Such bellows will withstand great internal and external pressures, but this construction prevents the bellows from being damaged by external pressure, regardless of how great such pressure may be, because the internal pressure is always equal to the external pressure, except for the expansive force of the bellows and the springs 35 and 38. To illustrate this fact, it will be assumed that the bellows and springs require 100 pounds per square inch to compress them far enough to seat the valve 29 upon its seat 30a, and that an additional 50 pounds per square inch would be required to compress the bellows and springs an additional one-half inch (both of these assumptions disregarding the air pocket within the bellows). It will be further assumed that the bellows is exposed to an external pressure of 10,000 pounds per square inch (the air pocket being now taken into account). The internal pressure exerted by the bellows upon the air pocket above the liquid level 18a therefore, will be 9,850 pounds per square inch when the bellows and springs are compressed the additional one-half inch by the 10,000 pounds external pressure. It results that 150 pounds per square inch is the total net force which will be exerted by such external pressure upon the bellows.

With reference to the foregoing illustration, it will be observed that the bellows might become damaged by such excessive external pressure as 10,000 pounds per square inch if it were not for the spring 38 which continues to be compressed and in so doing permits the bellows to continue compressing and compressing the air pocket within it after the valve 29 seats. This safety feature constitutes the principal inventive improvement herein over my said Patent No. 2,007,363.

Apart from the pressure regulator proper, certain other parts are employed below it for anchoring purposes and certain other parts are employed above the regulator for the purpose of enabling its being placed in the well and removed therefrom, as will be explained now.

The choke nipple 46, having a close sliding fit within the tubular portion 3e of the anchoring shell 3, is threadedly joined within the lower end of the member 28. The catching and releasing stem 47 has threaded connection with the nipple 46 (see Fig. 10).

The downwardly facing U cups or packing 11 and 11' housed within recesses interior of the portion 3e of the shell 3 closely engage the nipple 46 in order to provide hermetic engagement.

The pressure regulator assembly is anchored and held in place by the engagement of the anchoring lands 47e engaging under the lugs 6.

Gas pressure below the assembled shell, regulator, and choke now raises the dogs 1a away from the lower tubing end e and holds the dogs in contact with the upper tubing end d (see Fig. 10). It will be noted that the upper surfaces of these dogs are inclined inwardly slightly as appears at 1b, so that the greater the lifting force exerted by the gas under the assembly, the greater will be the outward drive of the dogs to more securely anchor the assembly.

The upper shell 42 (Fig. 9), housing the coiled spring 41 supported by the base ring 40 threadedly engaged within the connection base 36, and the ring 43 slidable within the shell, are means for securely attaching the catching and releasing tool 47A, (Fig. 8), which is guided into the shell 42 by the bevels 42a. This tool co-acts with the lugs 44 and 45, secured within the shell 42 by the welds 44a and 45a, as will be explained later.

Figure 14:
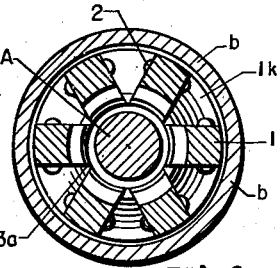
Fig. 14 is a cross section on the line 14—14, Fig. 11.

In operation, the gas pressure acting through the openings 9b quickly expands the yieldable sleeve 10, which may be of rubber or other tough packing substance, against the tubing a. The rubber sleeve 10 will be expanded against the tubing a because the annular projections 10a impair the clearance between the member 10 and the tubing, while the openings 1k, between the fingers 1 (Figs. 3, 5, and 14), provide ample draft to cause the gas pressure to act upon the interior surface of the sleeve 10 and expand it as stated. The U cups 11 and 11', at the same time, prevent any escape of gas between the members 3 and 46. Therefore, the only open path for the gas is through the inlet slots 47h, the opening 47j, and the choke passage 46a providing that the gas may contact the bellows 18 via the central opening through the members 33 and 30 and the clearance of the members 25 and 21 with the sleeve 34.

It will be noted that the choke passage 46a is of somewhat smaller diameter than that of the opening 47j. This difference in diameters is to prevent the more-expensive-to-manufacture catching and releasing stem 47 from being cut or abraded by sand sometimes present in well fluids.

The pressure responsive bellows is compressed by the fluid pressure contacting its exterior surface, causing the valve 29 to close upon its seat 30a at a predetermined value of the fluid pressure. It is evident that this valve will re-open when the pressure upon the bellows decreases sufficiently. In this manner, the regulator will maintain a predetermined constant pressure within the tubing above the valve 29.

It will be noted that the bellows is anchored at its lower end upon the member 21, while its upper end is secured to the member 19 which in turn is yieldably joined to the member 36 by means of the spring 38, the rod 37, and the wing nut 39. All movements of the bellows, therefore, are communicated to the drive sleeve 34, which, in turn, transmits these movements to the valve 29.

The regulator may be adjusted so that its valve 29 will close on the seat 30a at higher or lower pressures contacting the exterior of the bellows by screwing the valve seat member 30 upward or downward. Screwing it downward lengthens the valve travel and consequently increases the distance that the bellows and springs must be compressed before the valve will seat. This, as is apparent, increases the pressure required to seat the valve. Screwing the member 30 upward, of course, will lessen the pressure at which the regulator will close its valve.

Lengthening the air pocket above the liquid level 18a will lessen the closing pressure of the valve at any given valve travel adjustment, and vice versa, because the longer this air pocket, the less will be the internal resistance offered by it to compression of the bellows any given distance, and vice versa.

The pressure regulator, modified form

The modified form of pressure regulator illustrated in Fig. 21 has a yieldable valve seat member 50 supported by the coiled spring 51. The compression force of this spring may be adjusted by the ring 52 having threaded engagement within the member 28A. The adjustment may be secured by the lock ring 53. The internal annular shoulder 28Aa serves to limit the upward travel of the member 50.

The member 19A, having an extension 19Aa threadedly engaged within the member 36A, provides for adjusting the regulator for different pressures by controlling the distance between the valve 29 and its seat 30a. The nut 39A may be employed to secure the adjustment.

After the bellows has been sufficiently compressed to engage the valve 29 upon the seat 30a, if great pressure should contact the bellows it will continue to shorten and compress the spring 51 until the air pocket above the liquid level 18a will become sufficiently compressed to arrest further compression of the bellows, as was explained in connection with Fig. 9.

Otherwise than stated, this modified form is entirely similar to the preferred embodiment shown in Fig. 9.

The pressure regulator, construction, operation, and anchoring means having been described, the manner of anchoring the regulator and/or choke in the tubing and of removing same therefrom will be discussed now by describing the operation of the catching and releasing tool.

The catching and releasing units

The catching and releasing devices are somewhat similar to the cable pull overshot shown in my said Patent No. 2,250,463.

These devices are in two similar units; the lower unit being designated generally as 47, remains in the well to releasably secure therein the regulator and/or choke, and the upper unit or tool being designated generally as 47A, is withdrawn from the well after each placement therein of the regulator and/or choke, both units appearing in Fig. 8. There are only two differences between these units. The upper unit appearing in Figs. 8, 11, 12 and 27 is solid and has no central opening such as 47j in Fig. 10. The other difference is that the unit 47 is threadedly joined to the choke nipple 46 as appears in Fig. 10; whereas the unit 47A has a shank threadedly joined to the member 13, as appears in Fig. 8.

Fig. 8 may be employed to describe the regulator and choke assembly in the act of being anchored in the tubing or of being removed therefrom.

The first operation will be to anchor the regulator and choke assembly. In so doing the assembly as shown in Fig. 8 is being lowered upon the cable 14, the weight 16 being about the cable and resting upon the member 13, as in Fig. 27.

The lugs 5 and 6 are of such length as will allow the round part of the lower unit stem 47 to pass them with slight clearance. The slots 47d are of such width as to allow the lugs 5 and 6 to be passed. The slots 47a and 47a' of the stem 47 are narrower than the slots 47d but wide enough to permit the guide lug 5 to be passed. These slots, however, are narrower than the lugs 6. The lug 5 is directly above one of the lugs 6 and has its upper surface rounded or sharpened so that the wedge-shaped surfaces 47f will not become lodged upon it. The slots 47a and 47a' are out of alignment with each other in such manner that the lands 47b are centrally over the slots 47a' and the lands 47b' are centrally under the slots 47a. There are four evenly spaced lands 47b and four lands 47b' with the same number of evenly spaced slots 47a and 47a', although the number of these lands and slots may be varied, as set out in my said Patent No. 2,250,- 463. There are shown in this application, however, only two evenly spaced lands 47e and two evenly spaced slots 47d, as will appear more clearly from an examination of Figs. 8, 10, and 30.

Figures 8, upper part, and 27, show the stem of the tool 47A for inserting and removing a pressure-controlling device, and Fig. 12 the corresponding part of a tool for removing the anchoring assembly, both of which show lands and slots identical with those of the stem 47 and bearing the reference characters 47Aa, 47Ab, 47Ac, 47Aa' 47Ab', and 47Ac', respectively, in Figs. 8 and 27. Likewise, the slots 47Ad, the lugs 47Ae and the wedge-shaped lower ends 47af in Figures 8, 12, and 27 correspond in construction and purpose to the configurations 47d, 47e, and 47f in Figs. 8 and 10. The units 47 and 47A, however, are distinct devices serving related but different purposes, as will appear.

The regulator and choke assembly being lowered further, the wedge-shaped ends 47f of the stem 47 will guide the lands 47e to pass the lug 5 via one of the slots 47d and continuing the lands 47b' will pass the lug 5. One of the sloping ends 47c then contacts the lug 5 which contact causes the stem 47 to rotate slightly impelling one of the sloping ends 47c to guide the lands 47b to receive the lug 5 in one of the slots 47a. The wedge-shaped ends 47f in the meantime contact the spring rider ring 7 and force it downward, compressing the spring 8 (see Fig. 10). The lower ends of the lands 47b' will land then upon the lugs 6. In the meantime, the lower lands 47Ae of the tool 47A have contacted the spring rider ring 43 and forced it downward, compressing the spring 41 having slight clearance within the nipple 42, until the lands 47Ab' rest upon the lugs 44 secured within the shell 42 by the welds 44a. The slots 47Aa and 47Aa' of the tool 47A being wide enough to pass the lug 45 are narrow enough to cause the lands 47Ab' to be stopped by the lugs 44. In this operation, the guide lug 45, secured within the shell 42 by the welds 45a, serves the same purpose as the lug 5 of the stem 47. The spring base 40, Fig. 9, serves to support the spring 41 and to provide means for regulating its compression force, as is apparent.

After being landed as stated, the assembly is raised then by the cable 14 and the expansive force of the springs 8 and 41 during which operation one of the sloping surfaces 47c' will contact the guide lug 5 and further rotate the member 47 in the same direction as before until the lug 5 will be received in one of the slots 47a'. The upper ends of the lands 47e will be then directly under the lugs 6 as in Fig. 10.

The catching and releasing tool 47A, in the meantime, has been executing similar movements to those described for the lower stem 47, except that the movements of the tool 47A were one step ahead of the movements of the lower stem 47. This is true because the tool 47A was assembled with the shell 42 for lowering into the well with its lands 47Ae engaged under the lugs 44, while the similar engagement of the lands 47e under the lugs 6 will not occur until after the stem 47 has been set down upon the ring 7 and has compressed the spring 8 and thereafter has been raised. In this manner the upper tool 47A will become disengaged from the lugs 44 by similar movements caused by the slots 47Aa, 47Aa', and 47Ad, the lands 47Ab, 47Ab', and 47Ae, the wedge-shaped lower ends 47Af, and by the lugs 44 and 45, while the lower assembly 47 is having its lands 47e engaged under the lugs 6. The upper assembly 47A is free now to be withdrawn from the well, leaving the regulator and choke assemblies in place as shown in Figs. 9 and 10.

By way of explaining the statement that the tool 47A was one step ahead of the lower stem 47, attention is directed to the face that the lands 47Ae of the tool are engaged under the lugs 44 to begin with, while the lands 47e of the stem 47 will not become engaged under the lugs 6 as in Fig. 10 until after the lowering and raising operation has been completed as above described. While the lower stem 47 is being rotated 90 degrees to engage the lands 47e under the lugs 6, the tool 47A is completing its 90 degree turn in the same manner, which places the slots 47Ad in registration with the lugs 44.

The foregoing operation will be understood clearly if it is borne in mind that the lower catching and releasing stem engages its lands 47e under the lugs 6 when the stem is let down and then raised the first time, and that this engagement is broken the second time the stem is let down and raised, because the lugs 6 and the slots 47d then are brought into registration by the action of the slots 47a and 47a' and the sloping surfaces 47c and 47c' in continuing the rotating movement of the stem 47.

The assemblies 47 and 47a are actuated in exactly the same manner, the land, sloping surfaces and slots of each being similar to those of the other, as well as the lugs 44 and 45 of the upper unit being similar to the corresponding lugs 6 and 5 of the lower unit. The lower stem 47 has a pointed end 47g, and the upper assembly has a pointed lower end 47Ag, each serving as guides.

It should be observed that the sloping ends 47c and 47c' of the lower stem are inclined in opposite directions from each other and that the same is true of the corresponding sloping ends 47Ac and 47Ac' of the tool. This is necessary in order for these sloping ends to produce rotation in the same direction, because the upper of these sloping ends are urged to rotate the tool or stem by a downward thrust upon the guide lugs 5 and 45, respectively, and the lower of these sloping ends are urged to rotate the tool or stem by an upward thrust upon the respective lugs 5 and 45.

The slots 47a and 47Aa of the stem and tool 47 and 47A are shown spaced 90 degrees apart. The slots 47a' and 47Aa' of these members are shown similarly spaced. The lands 47e and 47Ae are shown spaced 180 degrees apart. It, therefore, follows that the lugs 6 and lands 47e of the lower stem 47 will become engaged the first time the member 47 is lowered, as stated, and then raised; and that the slots 47d will register with the lugs 6 the second time the member 47 is lowered and raised. It also follows that the lugs 44 will register with the slots 47Ad of the tool after the spring 41 has been compressed and the tool raised for withdrawal from the well.

While I have shown catching and releasing members having the lugs secured within the shells, it is apparent that the lugs may be placed on the tool and stem and the lands, sloping ends, and slots transferred to the shells; tools formed in either manner being considered full equivalents of tools formed in the other manner.

*Removing the pressure regulator and choke assembly*

To remove the regulator and choke assembly, run the upper catching and releasing tool 47A back into the tubing with the weight 16 resting upon the cable attachment 13 as in Fig. 8. The pointed lower end 47Ag of the tool and the bevel 42a of the shell will guide the tool 47A into the shell 42. The weight 16 will compress the springs 8 and 41 and each of the members 47 and 47A, acting independently of each other, will be rotated 90 degrees by the action of lands, slots, and lugs in a manner heretofore explained. In this operation, the lower stem 47 will release the lugs 6 through the slots 47d while the upper tool 47A will engage the lands 47Ae under the lugs 44. The regulator and choke assembly then may be withdrawn.

*Removing the anchoring shell*

To remove the anchoring shell assembly, attach the tool 47A to the cable attachment 13 as in Fig. 11 with the latching shell 12A in place about the member 13. While this fishing-out assembly is being lowered, the shoulder 12Ab will engage upon the upper enlargement 47Ah of the tool 47A, but when this assembly reaches the anchoring shell assembly, the latching shell 12A, having the mud and fluid vent holes 12Ac, will land upon the upper extensions 1d of the fingers 1. The weight 16 is then dropped down the well along the cable onto the latching shell, and will force the latch shoulder 12Aa to engage under the shoulders 1c of the fingers slightly before the lands 47Ab' engage upon the lugs 6. At the same time, the upper ends of the fingers will be forced inward, thus forcing the dogs 1a from their expanded position within the space c between the tubing ends d and e. Before the latched engagement between the fingers 1 and the shell 12A is formed, the tool 47A has engaged its wedge-shaped lower ends 47Af upon the ring 7 and compressed the spring 8. When the fingers 1 have been forced inward far enough to disengage the dogs 1a from between the tubing ends d and e the anchoring shell assembly might be forced downward without the latching engagement being completed between the members 1 and 12A, if the lands 47Ae had not already taken position, as they have done, below the lugs 6 so as to engage them if any downward movement of the anchoring shell should occur.

It will be observed that when the shell 12A engages upon the upper ends 1d of the fingers, the tool 47A with the weight 16 resting upon the cable attachment 13, continues downward so that the full force of the weight 16 acts upon the shell 12A to force the finger extensions 1d inward.

When the dogs 1a have been disengaged, the anchoring shell may be withdrawn by the engagement of the lands 47Ae under the lugs. 6.

If the weight 16 should not be sufficient to free the dogs 1a from between the tubing ends, another similar weight may be dropped over the cable to cause such engagement, or the tool 47A may be raised sufficiently to engage the lands 47Ae under the lugs 6 and the cable and member 47A again lowered and raised; whereupon the fishing-out assembly may be withdrawn and again lowered with a heavier weight that will exert enough force upon the shell 12A to free the dogs.

The choke

The bottom hole choke, like the pressure-regulator and choke assembly in Figs. 8, 9, and 10 may be anchored in the tubing at any joint thereof, as is illustrated in Figs. 27 through 30.

The choke in combination with the pressure-regulator may consist of the choke nipple 46 having the constricted choke passage 46a in Figs. 9 and 10, this nipple being closely slidable within the U cups 11 and 11'. The choke alone closely slidable within the portion 3e of the anchoring shell 3 and the U cups 11 and 11', may be a short nipple 49 having its lower end threadedly joined to the stem 47 and its upper end similarly joined to the finned bushing 48 which latter member, having guide fins 48a slidable within the tubing, is threadedly connected into the shell 42. The choke passage 49a, preferably, is of a somewhat smaller diameter than that of the passage 47j through the lower stem 47 in order that the abrasive action of sand and the like in the well fluid will abrade it rather than the stem 47 which is more expensive to manufacture.

In setting the choke, the same anchoring shell parts 1 to 11', inclusive, are employed in the same manner as for setting the regulator and choke assembly.

Figs. 27, 28 and 30 illustrate the choke just landed in the well. The catching and releasing tool 47A has its lands 47Ae engaged upon the depressed slide ring 43. The lower catching and releasing stem 47, likewise, has its lands 47e engaged upon the other depressed spring rider ring 7.

The tool 47A is one step ahead of the lower stem 47, as in the similar process of setting the regulator and choke assembly, which operation was explained in connection with Fig. 8. This is true because while going in and just before the choke was landed, the tool 47A had its lands 47Ae engaged under the lugs 44; whereas, the similar lands 47e of the lower stem will become engaged under the lower lugs 6 when the cable is raised and weight 16 is lifted. The tool 47A then may be withdrawn, leaving the choke 49 set with the lands 47e engaged under the lugs 6. The lower spring 8 by expanding accomplishes this engagement.

Upon the return trip of the tool 47A, it is apparent that it will engage its lands 47Ae under the upper lugs 44; while the lower stem 47 will be released, as was explained for the similar operation with regard to the regulator and choke assembly.

It is apparent also that the anchoring shell assembly for the choke may be removed from the tubing in the same manner as was explained for removing the similar shell employed for anchoring the regulator and choke assembly.

Manifestly, the regulator alone may be removably secured within the anchoring shell assembly in the same manner as has been described for the choke alone, although this invention contemplates the primary use of the regulator and choke to be as a unit.

Those skilled in the art will know that the rubber sleeve 10 appearing in Figs. 2, 10, and 30 can be employed as a packer between the tubing and casing of wells wherever the required fluid pressure is available to expand it into sealing engagement with the casing.

Where introductory expressions and functional statements are employed in the claims to follow, it will be understood that such expressions and statements relate to the best presently known mode of applying the invention, and are not to be regarded as limitations upon the claims, which contemplate that the invention will be applied to other and various uses.

I claim:

1. An anchoring tubular shell adapted to be received in tubular members such as well casings, well liners, and well tubings, said shell having rockable fingers with dogs thereon adapted to releasably engage between the adjacent ends of the tubing in a joint of said tubular members for anchoring the shell therein, said fingers being mounted on one end of and outside the shell and extending in part beyond the end of the shell and in part lying alongside of the shell.

2. An anchoring shell adapted to be received in tubular members such as well casings, well liners, and well tubings, said shell having rockable fingers with dogs thereon adapted to releasably engage between the adjacent ends of the tubing in a joint of said tubular members for anchoring the shell therein; and a packer member on said shell, said packer being adapted to cut off the flow of fluid therearound.

3. An anchoring shell adapted to be received in well casings, well liners, and well tubings, said shell having a passage through the same from end to end and having fingers, rockably secured to one end thereof thereon; dogs on said fingers; and a spring normally urging said fingers to expand so as to engage said dogs between the adjacent ends of the tubing in any one of the joints of said casing, liners, and tubings for anchoring the shell therein.

4. An anchoring shell adapted to be received in well casings, well liners, and well tubings, said shell having fingers, rockably secured thereon; dogs on said fingers; a spring normally urging said fingers to expand so as to engage said dogs between the adjacent ends of the tubing in any one of the joints of said casings, liners, and tubings for anchoring the shell therein; a yieldable sleeve on said shell, said sleeve being adapted to be expanded into sealing engagement with a portion of said tubing to cut off the flow of fluid between said anchoring shell and the tubing; and lugs in said shell, said lugs being adapted to be releasably engaged by a catching and releasing member.

5. An anchoring shell adapted to be anchored in well casings, well liners, and well tubings, said shell having fingers rockably secured thereon; dogs on said fingers; a spring normally urging said fingers to expand so as to engage said dogs between the adjacent ends of the tubing in any one of the joints of said casings, liners, and tubings for anchoring the shell therein; a yieldable sleeve on said shell, said sleeve being adapted to be expanded into sealing engagement with a portion of said tubing to cut off the flow of fluid between said anchoring shell and the tubing; and lugs in said shell, said lugs being adapted to be releasably engaged by a catching and releasing member, said fingers having an external recess and upwardly sloping external surfaces, said surfaces being adapted to be engaged by a shell-shaped placing or removing tool having an internal shoulder engageable within said recess, said dogs extending outward of said shell so that said fingers may be disengaged from said shell by another shell exterior of said first shell.

6. A placing tool for positioning an anchoring shell within a well, said tool comprising an attachment upon a cable; a shell secured upon said attachment, said shell being adapted to releasably engage an anchoring shell assembly; a second shell slidable over said first shell and adapted to disengage said first shell from said assembly; and a weight slidable over said cable, said weight being adapted to be dropped from the top of the well and to impact said second shell to disengage said first shell from said assembly.

7. A placing tool for positioning an anchoring shell assembly within a well tube, comprising: an attachment upon a cable to be lowered into the well, said attachment including a downwardly projecting shell adapted to engage yieldable latching means on said assembly; a second shell slidable on said attachment and enclosing said first shell and adapted to engage said anchoring shell for disengaging it from said first shell; and a weight slidable over said cable and adapted to be dropped to impact said second shell to cause it to disengage said first shell from the anchoring assembly.

8. A removing tool for disconnecting an anchoring shell assembly from a well casing or tube, comprising: an attaching member secured to a cable to be lowered into the well; a shell vertically slidable for a limited distance upon said member and having a lower extension adapted to engage over locking fingers on said assembly to unlock the same from the casing or tube and to become engaged with portions of said fingers preliminary to lifting the anchoring assembly out of the well; a weight slidable on the cable for impacting said shell and causing it to perform said operations; and a stem carried by said attaching member and adapted to enter the bore of said anchoring shell, said bore and said stem having a set of lugs on one element and a set of lands on the other element adapted, upon successive lowering and raising of the tool, to interlock the stem with the anchoring shell prior to the unlocking of the latter, and to support the anchoring shell to insure the lifting engagement of said slidable shell with said fingers.

9. A removing tool for disconnecting an anchoring shell assembly from a well tube and removing it from the well, said tool comprising: a cable with an attaching member secured to the same; a disconnecting and assembly engaging member adapted to slide for a limited distance on said attaching member; and a weight slidable over said cable and adapted to be dropped from the top of the well to impact said disconnecting and engaging member and force it to disconnect said anchoring assembly from the well tube and form a lifting engagement with the assembly for withdrawing the same from the well.

ALEXANDER BOYNTON.